United States Patent
Seegert et al.

[11] Patent Number: 5,845,471
[45] Date of Patent: Dec. 8, 1998

[54] ADJUSTABLE GAUGE WHEEL FOR MOWER DECK

[75] Inventors: Brian David Seegert, Hartford; Gary David Hohnl, Slinger, both of Wis.

[73] Assignee: Deere & Company, Moline, Ill.

[21] Appl. No.: 879,724

[22] Filed: Jun. 20, 1997

[51] Int. Cl.$^6$ .................................................. A01D 34/68
[52] U.S. Cl. .............................................................. 56/17.2
[58] Field of Search .................................. 56/17.2, 16.7, 56/17.1, 1, DIG. 3, DIG. 10

[56] References Cited

U.S. PATENT DOCUMENTS

| | | | |
|---|---|---|---|
| 4,321,785 | 3/1982 | Kaland | 56/17.2 |
| 4,840,020 | 6/1989 | Oka | 56/15.2 |
| 5,179,823 | 1/1993 | Pace | 56/17.2 X |

FOREIGN PATENT DOCUMENTS

| | | | |
|---|---|---|---|
| 671157 | 9/1963 | Canada | 56/17.2 |

OTHER PUBLICATIONS

Deere & Co., Parts Catalog for Sabre, 1 page, dated 1996, published in the U.S.A.

Deere & Co., Parts Catalog PC2399 entitled "STX38, STX46 (Black Mower Deck)", pp. 85–86 and 85–87, dated 19 Sep. 1995, published in the U.S.A..

Deere & Co., Parts Catalog PC2264 entitled "21 Walk Behind 14PB"2 pages, date unknown, published in the U.S.A.

Deere and Co., Advertising brochure DKE6106 entitled "14SX Commercial Walk–Behind Mower", 2 pagers, dated Jun. 1994, published in the U.S.A..

*Primary Examiner*—Terry Lee Melius

[57] ABSTRACT

An adjustable gauge wheel assembly is provided for use on rotary mower decks. The wheel and its axle are carried on an arm which is pivotally supported by a deck mounted bracket. The pivotal support is adapted to allow the arm to be shifted towards and away from the bracket. The axle includes a portion which protrudes through the arm for insertion into one of the plurality of vertically spaced openings in the bracket as the arm is shifted. The bracket therefore provides for vertical adjustment of the gauge wheel as well as a direct support against impact loadings encountered by the wheel. An over-center latch mechanism is provided to quickly and easily lock the arm in its adjusted position.

5 Claims, 2 Drawing Sheets

ADJUSTABLE GAUGE WHEEL FOR MOWER DECK

FIELD OF INVENTION

The present invention relates to rotary mowers and more specifically to adjustable wheel mechanisms used to control the height of cut of such mowers.

DESCRIPTION OF RELATED ART

Rotary mowers are commonly used to cut grass and similar vegetation to a desired height above the ground. Typically the mower decks are equipped with gauge wheels which are attached to the skirt of the deck. The wheels ride on the ground a fixed distance below the deck and their cutting blades and serve to maintain the height of cut a fixed distance above the ground.

Since it is sometimes desirable to cut grass or other types of vegetation at different heights, gauge wheels have been equipped with adjustment mechanisms to permit them to be raised or lowered relative to the deck and its blade.

Some gauge wheel adjustment mechanisms provide for the wheels to be carried on a strap having a plurality of openings. Adjustment of the wheel is accomplished through moving the wheel and strap to align one of the openings with an opening in the deck bracket. Bolts with nuts are often used to secure these straps in one of the adjusted settings.

Other adjustment mechanisms provide for gauge wheels to be carried on a swingable arm. The arm is fixed to a handle pivotally mounted on a deck bracket. The handle is biased toward engagement with openings in the deck bracket. Adjustment of the height of the wheels with these mechanisms is accomplished through moving the handle out of engagement with one bracket opening and shifting it into engagement with another bracket opening, thereby adjusting the arm at its wheel along a vertical arc.

These types of wheel adjustment mechanisms carry the wheels on axles supported by structural straps or arms carried to one side of the deck brackets. Therefore, loadings encountered by the wheel axles, such as may occur when the deck is moved over rough terrain or when the wheel is used to prevent scalping, can damage or brake the mechanism or its parts.

It would therefore be desirable to provide a mower deck gauge wheel support mechanism which is adjustable to vary the height of cut of the mower blade where that mechanism has a gauge wheel axle that is directly supported by the bracket. Additionally, it would be desirable to provide such an adjustment mechanism which could be quickly and easily manipulated without requiring the removal of bolts, nuts or other parts or the use of separate tools.

SUMMARY OF INVENTION

Toward these ends, there is provided an adjustable gauge wheel mechanism usable with rotary decks as height gauging wheels or as anti-scalping wheels. The mechanism includes an arm that is pivotally mounted to a deck bracket having a plurality of vertically spaced openings. The arm carries a wheel supporting axle which also protrudes through the end of the arm. The pivotal mounting between the arm and bracket is shiftable to allow the arm and its axle to be moved away from or towards the bracket and the protruding end of the axle to be removed from or inserted into one of the vertically spaced bracket openings to vary the height of the wheel relative to the deck. An over-center latch mechanism is secured to the pivot pin and permits it and the arm to be slidably advanced toward and away from the bracket to permit insertion and removal of the protruding end of the registry of the axle into one of the selected adjustment openings.

DESCRIPTION OF THE PREFERRED EMBODIMENT

Figure 1:
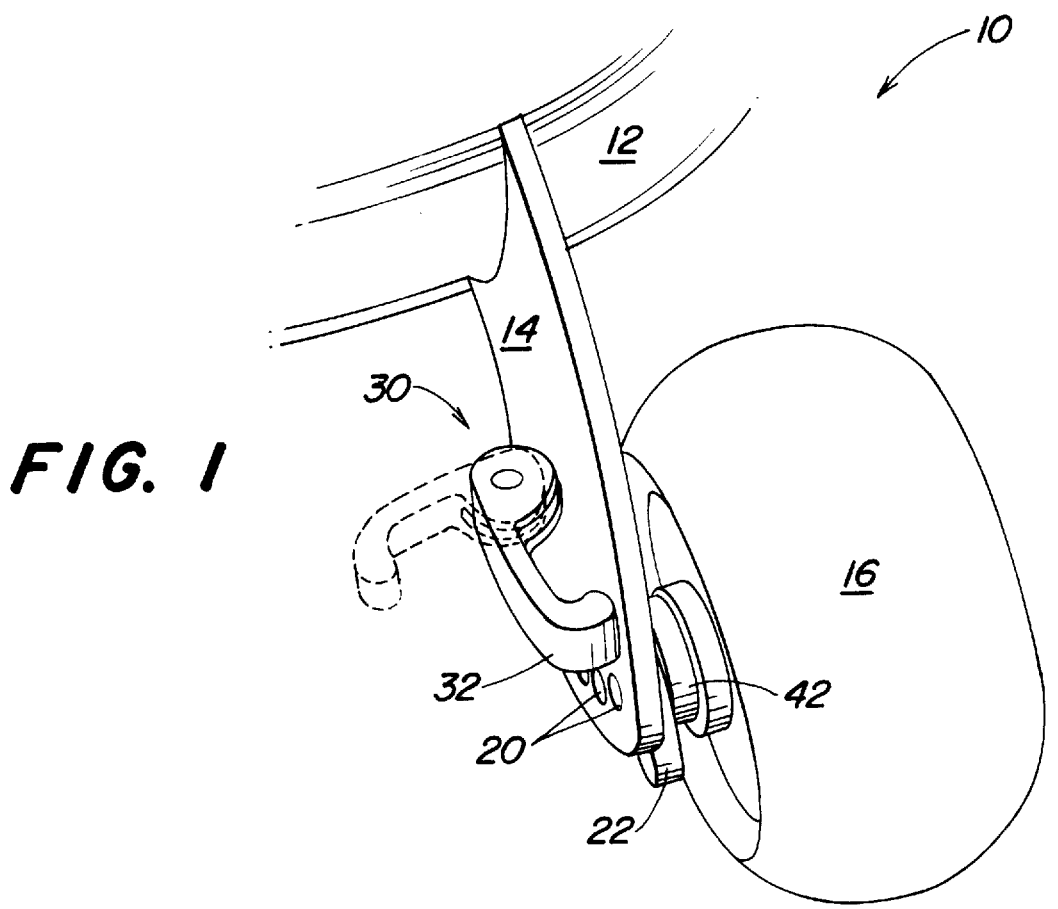
FIG. 1 is an enlarged, elevated perspective view illustrating a partial mower deck and the adjustment mechanism and gauge wheel.

Looking to FIG. 1, there is illustrated an enlarged elevated perspective view of the gauge wheel adjustment assembly 10 carried at the forward portion of a mower deck 12. The assembly utilizes a bracket 14, which is attached to the deck 12 by welding of similar conventional means and in turn supports the wheel 16 for vertical adjustment.

Figure 2:
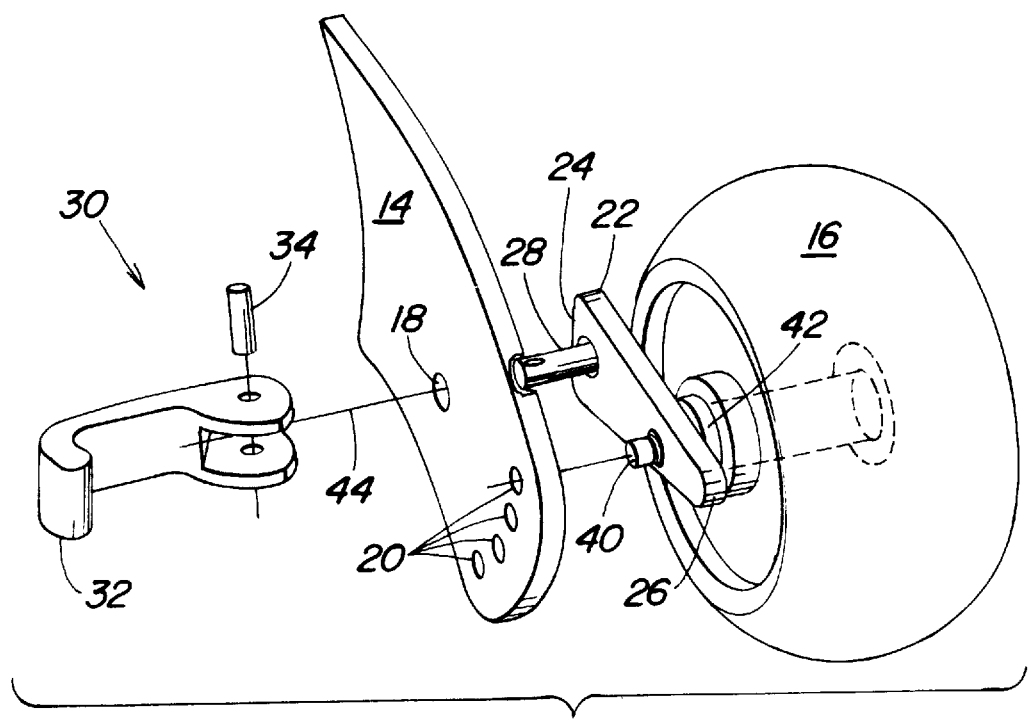
FIG. 2 illustrates the adjustable gauge wheel mechanism with the arm separated from the mounting bracket.
Figure 3:
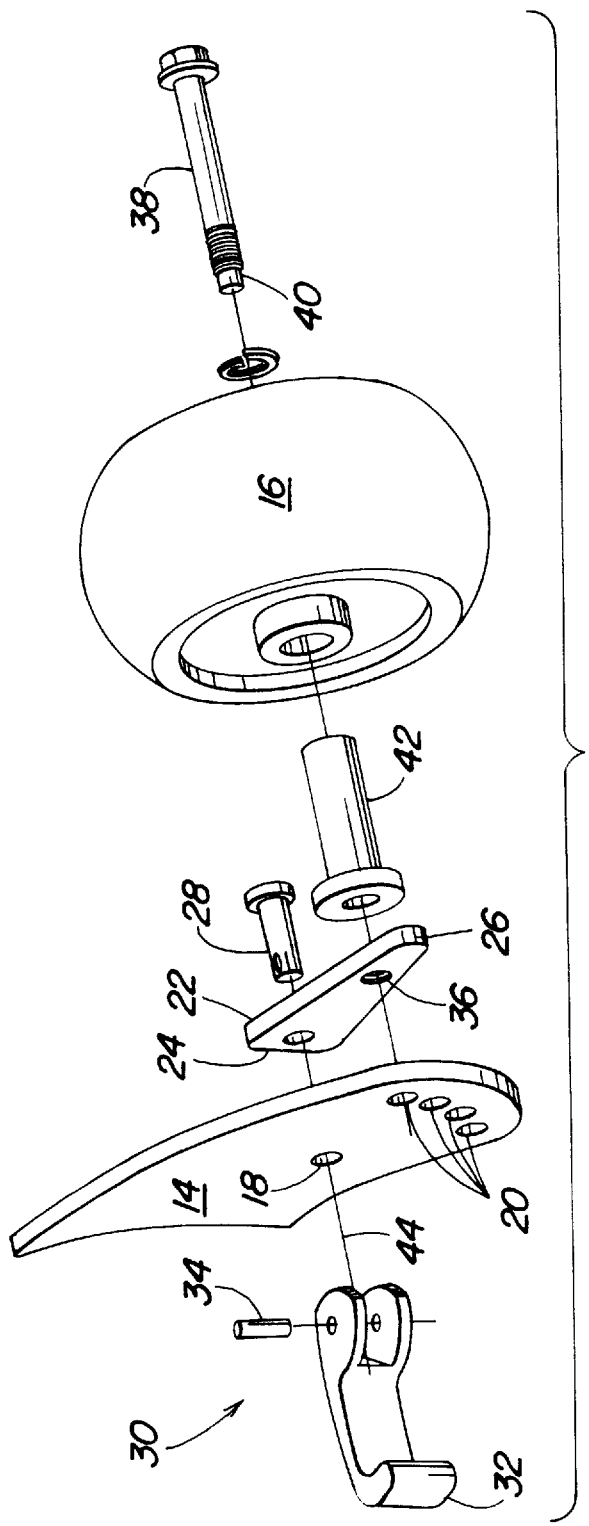
FIG. 3 is an exploded view of the wheel, mounting bracket and related parts.

Looking also to FIGS. 2 and 3, it is seen that the bracket 14 includes a first opening 18 as well as a plurality of second openings 20 radially spaced from the first opening 18. The wheel 16 is carried on an elongated gauge wheel adjustment arm 22 provided adjacent the bracket 14. The arm 22 includes first and second spaced apart ends 24 and 26. On the first end 24, a pivot means in the form of a pivot pin 28 is rigidly secured to the arm 22. The pin 28 is sized so that it can be slidably shifted left and right, as viewed in FIGS. 2 and 3, within the first opening 18 in the bracket 14. This allows the pin 28 to slide laterally and move the arm 22 closer to the bracket 14 or away from it. The pin 28 is coupled to a locking means 30 which serves to lock the pin 28 and arm 22 in its position closely adjacent to the bracket 14, see FIG. 1. The locking means 30 takes the form of an over-center latch with a handle 32 which is secured to the pin 28 through the use of a key 34 or similar type of conventional fastening means.

Looking now to FIG. 3, it can be seen that the arm 22 includes an opening 36 at its second end 26 which is threaded to receive the wheel axle 38. The axle 38, which takes the form of a bolt in the preferred embodiment, includes an end 40 which is smaller than the threaded opening 36 in the arm 22. The threaded opening 36 permits the bolt 38 to be secured to the arm 22 and allows the end 40 to protrude from the arm 22 when it has been inserted through the gauge wheel 16 and bushing 42 and threaded into the arm 22. Once the wheel 16 has been assembled on the axle 38 and bushing 42, as shown best in FIG. 2, the end portion 40 of the axle 38 projects beyond the edge of the arm 22 sufficiently that it can be slidably inserted into any of second openings 20 of the bracket 14.

To adjust the gauge wheel position, the operator would first flip the over-center latch handle 32 from the position illustrated in solid in FIG. 1 to that illustrated in phantom in FIG. 1. Accordingly, the pivot pin 28 would be able to be slidably moved to the right as viewed in FIG. 2 thereby moving the arm 22 away from the bracket 14 and allowing the protruding end portion 40 of the axle 38 to be slidably removed from one of the second openings 20. Thereafter, the arm 22 would be rotated about the pivot axis 44 through the pivot pin 28 to align the protruding end portion 40 of the axle 38 with another of the second openings 20. The over-center handle 32 would then be moved back to the position illustrated in solid in FIG. 1 in order to shift the arm 22 and wheel 16 closer to the bracket 14. As the arm 22 is shifted, the end portion 40 would be received within a different second opening 20 to provide a change in the vertical height of the gauge wheel 16 relative to the mower deck 12 and blade.

With the present invention there is provided an adjustable gauge wheel mechanism which permits quick and easy adjustment of a gauge wheel without the need for tools. Since the deck bracket directly supports the protruding axle of the gauge wheel, impact and/or similar loadings encountered by the wheel during operation will be transferred to and absorbed directly through the bracket to minimize damage to the parts.

I claim:

1. An adjustable gauge wheel assembly usable on a mower deck including a bracket secured to the deck and extending outwardly therefrom, the bracket including a first opening and a plurality of second openings radially spaced from the first opening;

an elongated gage wheel adjustment arm carried alongside the bracket, said arm having spaced apart first and second ends;

pivot means mounted on the first end of the arm and extending outwardly therefrom, said pivot means being slidably receivable in the first opening of the bracket and being adjustable through that opening between a first position where the arm is adjacent the bracket and a second position where the arm is spaced from the bracket;

a gage wheel axle secured to the second end of the arm, the axle extending to an end portion carried between the arm and the bracket, said end portion adapted to be received in one of the second openings of the bracket when the arm is in its first position and spaced from the second openings when the arm is in its second position;

a gauge wheel rotatably mounted on the axle, and locking means coupled with the pivot means for releasably securing the pivot means in its first position.

2. The invention defined in claim 1 wherein the pivot means includes a pivot pin and the locking means is comprised of an over center latch secured to the pivot pin.

3. The invention defined in claim 1 wherein the axle is threadably secured to the arm.

4. The invention defined in claim 1 wherein the bracket is adapted to extend laterally from the mower deck.

5. An adjustable gauge wheel assembly usable on a mower deck including a bracket secured to the deck and extending outwardly therefrom, the bracket including a first opening and a plurality of second openings radially spaced from the first opening;

an elongated gage wheel adjustment arm carried adjacent to the bracket, said arm having spaced apart first and second ends;

pivot means mounted on the first end of the arm and extending outwardly therefrom, said pivot means being receivable in the first opening of the bracket and being slidably adjustable through that opening between first and second positions;

gage wheel axle support means secured to the second end of the arm;

a gauge wheel rotatably mounted on the axle support means;

an axle extension extending from the axle support means and projecting to an end portion adjacent the bracket, said extension adapted to be removably received in any of the second openings in the bracket; and locking means coupled with the pivot means for releasably securing the pivot means in its first position and the extension in one of the second openings.

* * * * *